(12) United States Patent
Köhler et al.

(10) Patent No.: US 11,949,876 B2
(45) Date of Patent: Apr. 2, 2024

(54) METHOD AND SYSTEM FOR EMBEDDING INFORMATION IN A VIDEO SIGNAL

(71) Applicant: e.solutions GmbH, Ingolstadt (DE)

(72) Inventors: Thomas Köhler, Fürth (DE); Johannes Scheitacker, Erlangen (DE)

(73) Assignee: E.SOLUTIONS GMBH, Ingolstadt (DE)

( * ) Notice: Subject to any disclaimer, the term of this patent is extended or adjusted under 35 U.S.C. 154(b) by 45 days.

(21) Appl. No.: 17/972,083

(22) Filed: Oct. 24, 2022

(65) Prior Publication Data
US 2023/0127416 A1    Apr. 27, 2023

(30) Foreign Application Priority Data
Oct. 26, 2021    (EP) ..................................... 21204620

(51) Int. Cl.
*H04N 19/137*    (2014.01)
*H04N 21/435*    (2011.01)

(52) U.S. Cl.
CPC ......... *H04N 19/137* (2014.11); *H04N 21/435* (2013.01)

(58) Field of Classification Search
CPC .... H04N 19/137; H04N 21/435; H04N 21/80; H04N 21/8358

(Continued)

(56) References Cited

U.S. PATENT DOCUMENTS

2004/0247154 A1    12/2004   Bodo
2019/0279330 A1*   9/2019    Kim ...................... G06T 1/0021
(Continued)

OTHER PUBLICATIONS

European Search Report issued for corresponding Application No. 21204620.5 dated Apr. 21, 2022.
(Continued)

*Primary Examiner* — Dominic D Saltarelli
(74) *Attorney, Agent, or Firm* — TAROLLI, SUNDHEIM, COVELL & TUMMINO L.L.P.

(57) ABSTRACT

A method for embedding information in a video signal is described. The method comprises receiving (305) a message (30) including the information; dividing (310) the message (30) in a first message part (132) and a second message part (134); acquiring (320) a first video frame (9) and a second video frame (10) from the video signal, wherein the second video frame (10) is temporally subsequent to the first video frame (9), and the video frames (9, 10) each include a pre-set number of pixels; and determining (330) a motion map (122) associated with the second video frame (10), wherein the motion map (122) indicates a movement of each of the pixels of in the second video frame (10) compared to the first video frame (9). The method further comprises embedding (360) the first message part (132) in the pixels of the second video frame (10) including weighting the first message part (132) for each pixel of the second video frame (10) based on the motion map (122); and embedding (365) the second message part (134) in the pixels of the second video frame (10) including weighting the second message part (134) for each pixel of the second video frame (10) based on an inverse of the motion map (122). Furthermore, a graphical encoder (100) and a system (1) are described, which are configured to perform such method.

15 Claims, 5 Drawing Sheets

(58) Field of Classification Search
USPC .................................................. 375/240.01
See application file for complete search history.

(56) References Cited

U.S. PATENT DOCUMENTS

2023/0055101 A1* 2/2023 Reed ..................... H04L 9/3213
2023/0376577 A1* 11/2023 Flöther ................. G06N 10/80

OTHER PUBLICATIONS

Golikeri Adarsh: "Robust digital video watermarking scheme for H.264 advanced video coding standard", Journal of Electronic Imaging., vol. 16, No. 4, Oct. 1, 2007 (Oct. 1, 2007), pp. 1-14, XP055909961, US, ISSN: 1017-9909, DOI: 10.1117/1.2816054.
Chen Huafeng et al: "Motion Maps and Their Applications for Dynamic Object Monitoring", Pattern Recognition. Image Analysis, Allen Press, Lawrence, KS, US, vol. 29, No. 1, Apr. 27, 2019 (Apr. 27, 2019), pp. 131-143, XP036769106, ISSN: 1054-6618, DOI: 10.1134/S1054661819010139.

* cited by examiner

METHOD AND SYSTEM FOR EMBEDDING INFORMATION IN A VIDEO SIGNAL

RELATED APPLICATIONS

The present invention is a U.S. Nonprovisional Application, claiming priority to European Patent Application No. 21204620.5, filed on Oct. 26, 2021; the entirety of which is hereby incorporated herein by reference.

The present invention relates to a method and system for embedding information in a video signal. In particular, the present invention relates to a method for embedding information in a video signal taking into account a motion map associated with a currently processed video frame, and further relates to a graphic encoder configured to perform the method as well as a system comprising a camera and such graphic encoder.

Some applications and services involve processing of live images captured by a camera (e.g., a real-time video). For instance, in a vehicle certain driver assistance systems and/or autonomous driving control involve cameras screening the street activity in the vicinity of the vehicle. These systems and control processes sometimes include several processing units or software modules used for different tasks, which all rely on the camera signal, and some of which also rely on object detection in the surrounding vicinity of the vehicle. This includes observing and following objects, for example immobile objects as well as moving objects, such as a person, another vehicle, etc. The image of the camera, in certain instances, is also displayed as it is captured, i.e. without any detected object(s) and/or information marked or highlighted therein.

In case of object detection, the identification and/or classification of objects may be completed at a different time than image processing for the display of a camera signal. Thus, timestamps or the like are used to allow synchronous processing and/or outputting of the different data signals. This, however, results in processing overhead, since synchronous information has to be revealed from different data signals or data streams.

It is therefore an object of the present invention to provide a method and system improving processing and storing of time sensitive information and video information.

This object is solved by a method comprising the features of claim 1, a graphical encoder comprising the features of claim 9, and a system comprising the features of claim 10.

Preferred embodiments are defined by the dependent claims.

According to a first aspect to better understand the present disclosure, a method for embedding information in a video signal comprises receiving a message including the information, dividing the message in a first message part and a second message part, acquiring a first video frame and a second video frame from the video signal, wherein the video frames each include a pre-set number of pixels, and wherein the second video frame is temporally subsequent to the first video frame. The method further comprises determining a motion map associated with the second video frame, wherein the motion map indicates a movement of each of the pixels of the second video frame compared to the first video frame.

The first message part and the second message part may be derived by splitting the message in two portions, so that both message parts together form the original message. This division can be made on the basis of bits representing the message, symbols representing the message and/or context-based portions of the message. For instance, in case the message stems from object detection in a video signal, the message may be divided into two parts having the same number of bits or symbols, or may be divided into two parts, each comprising the information on a predefined number of objects.

The first and second video frame are temporally subsequent to one another, i.e. the second video frame is captured at a later point of time than the first video frame. While the second video frame can be the video frame directly captured after the first video frame, the temporal distance between both video frames may be more than one frame. Thus, temporally subsequent may also be based on a frame rate of the video signal.

The method further comprises embedding the first message part in the pixels of the second video frame including weighting the first message part for each pixel of the second video frame based on the motion map, and embedding the second message part in the pixels of the second video frame including weighting the second message part for each pixel of the second video frame based on an inverse of the motion map. In other words, image data of the second video frame is modified and/or replaced and/or supplemented with data from the message. Thus, a message can be stored (embedded) in the second video frame, wherein the message can represent information specific to this second video frame. This allows a frame-synchronous storage and availability of information avoiding the use of timestamps and corresponding processing of different data signals that require buffering and selecting synchronous data from the different signals or data streams.

Moreover, the divided message is embedded into the pixels in a weighted fashion, wherein the weight is defined by the motion map and an inverse of the motion map for the respective message parts. Specifically, the motion map represents movement of an object or a region in the second video frame that has a different position within the second video frame compared to the first video frame. In other words, pixels in the second video frame that represent the same object in the captured image are identical to or very similar to pixels representing the same object in the first video frame, but are arranged at different pixel positions within the frame. Thus, weighting the first message part based on the motion map leads to a higher influence on the pixels of the second video frame having motion, while weighting the second message part based on the inverse of the motion map leads to a higher influence on the pixels of the second video frame having less motion or being rather static. In other words, static pixels (i.e., the motion map for those pixels containing small motion magnitudes) are less affected by the embedded message compared to dynamic pixels.

Since the message is embedded in the pixels, such as pixel data, the original video data will be changed. This can lead to artefacts or other visible modifications of the pixel data when being displayed on a display. However, in regions of the video frame having a higher movement such artefacts or modifications are less detectable by the human visual system, since it is less sensitive with respect to moving regions than to static regions. Thus, if the modified second video frame having the message embedded therein is displayed on a display, the change of data is not visible for a human user or is only slightly derivable by the appearance of artefacts or the like.

The embedding of information in the pixel data further allows a compression of the video signal, for example, a lossy compression. Thus, the message can be stored or transmitted in a frame-synchronous manner while maintaining legacy image processing. The eventual loss of a portion of the information from the message due to the compression of the video signal is neglectable, since not all of the information will be lost and since object information is also present in a temporal preceding and/or subsequent video frame. Overall, sufficient information about the object will be available from the video stream including the second video frame and subsequent video frames. It is to be understood that conventional error detection and error correction methods can be applied (e.g., using a Hamming code) to increase reliability of the message received after decoding.

In an implementation variant, the first message part can comprise at least 50% of the message and the second message part can comprise the remainder of the message. Thus, 50% of the message or more is stored (embedded) in the second video frame with a focus on moving regions, where the human visual system will only hardly detect the modification or may not detect the modification at all. The remainder of the message, which can be 50% of the message or less, is stored (embedded) in the second video frame with a focus on less moving regions or static regions. Thus, depending on the size of the message, information can be embedded in the second video frame without being noticeable to the human visual system.

The dividing of the message into the first and second message part can comprise determining an overall size of the message and calculating a resulting data size per pixel (e.g., bits per pixel). Based on the data size per pixel, the dividing of the message can select or set a dividing ratio, such as 40% and 60%, 30% and 70% or even 10% and 90%, wherein the larger message part will be embedded in the pixels of the second video frame with a focus on moving regions, according to the motion map.

In a further implementation variant, the embedding of the first message part can comprise providing a first copy of data representing the second video frame, concatenating the first message part to the first copy, and weighting the concatenated data based on the motion map. The embedding of the second message part can comprise providing a second copy of data representing the second video frame, concatenating the second message part to the second copy, and weighting the concatenated data based on the inverse of the motion map. Thus, the embedding of the first and second message part can be performed simultaneously on the respective data copy. Moreover, the message information can be supplemented to the video data by the concatenation.

For instance, the second video frame can be pre-processed, such as performing a convolution, batch normalization and/or rectified linear unit processing. The resulting data representing the second video frame can be referred to as feature maps or the like. This data is then copied into the first and second copies.

The concatenation of the first message part to the first copy and the concatenation of the second message part to the second copy are each a supplementation of the feature map with the message bits. The message bits (actually the bits of each message part) can also be pre-processed.

The concatenated data can further be processed, such as by performing another convolution, batch normalization and/or rectified linear unit processing.

In yet a further implementation variant, the method can further comprise forming a steganography frame by merging the pixels of the second video frame (or data representing the second video frame) having the first message part embedded therein with the pixels of the second video frame (or data representing the second video frame) having the second message part embedded therein. The steganography frame corresponds to a video frame modified by embedding the message in the video data, such as the above pixel data of the second video frame. Particularly, when providing a first and second copy of the data representing second video frame, the merging of the pixels can be achieved based on parallel data or data streams output by the associated processing modules and, hence, in a fast and easy manner. The merging of the pixels or data representing the second video frame having the respective message part embedded therein includes taking into account the motion map. Particularly, the pixels with embedded data or data of the parallel data streams are weighted based on the motion map and the inverse of the motion map respectively.

Optionally, the forming of the steganography frame can further include merging the above already merged data with pixels or pixel data of the unaltered second video frame, i.e. that do not include a part of the message. For instance, the embedding of the message results in modified data, that can be contemplated as a residual that is supplemented to the original unaltered second video frame. In other words, the embedded data is added to the cover frame as a residual.

Alternatively, if the size of the message does not require modification of all pixels of the second video frame, in order to store (embed) the message therein, particular pixels or regions of the second video frame may be maintained unaltered.

In another implementation variant, the dividing of the message can comprise generating a first 3D-tensor having the message bits of the first message part. Specifically, each bit of the first message part is copied over width and height of one channel of the tensor, wherein width and height correspond to a width and height of the pixels of the second video frame (i.e., the pixel resolution of the second video frame). Dividing of the message can further comprise generating a second 3D-tensor having the message bits of the second message part, wherein each bit is copied over width and height of one channel of the tensor, and wherein width and height corresponds to the width and height of the pixels of the second video frame. For instance, the number of channels of the first and second 3D-tensor can correspond to the number of bits of the first and second message part, respectively. Each channel, hence, has a width and height corresponding to the width and height of the pixels of the second video frame and is filled with the same bit value (0 or 1). This generation of a first and second 3D-tensor facilitates concatenation of the message to the video signal/data of the second video frame, for example the first and second copy of data representing the second video frame to be concatenated with the respective message part.

In yet another implementation variant, the determining of the motion map can comprise calculating individual values of the motion map for each of the pixels as being a value between zero (0) and 1 and with a predefined average value of the second video frame. For example, the predefined average value of the second video frame can be between 0.1 and 0.49, preferably between 0.1 and 0.3, and is most preferably 0.25. In more detail, the motion map is determined or computed by setting a respective motion map value (e.g., each motion map value corresponding to a pixel or group of pixels) to 0 for a static pixel or region, to 1 for a dynamic pixel or region (of maximum movement) or a value therebetween.

In another implementation variant, the determining of a motion map comprises calculating an optical flow between the first and second video frames. The optical flow represents a distribution of motion of a video frame region (or the smallest possible region being a pixel). For instance, the optical flow can represent a distribution of motion of a particular video frame region relative to a static region (value of 0), relative to a minimum of all motions or relative to a maximum of all motions (value of 1). Thus, a map having the (pixel resolution) size of the second video frame can be provided that represents the distribution of motion over the second video frame, i.e. provides a motion map of the second video frame.

Furthermore, the optical flow can output a motion vector for each pixel with a horizontally component u and a vertically component v. A magnitude of the motion vector can then be calculated, e.g., as $sqrt(u^2+v^2)$, which is normalized to be between zero (0) and one (1) for each frame.

The average of the normalized optical flow magnitude (normalized motion vector) is then brought to the predefined average value of the second video frame, e.g. as indicated above between 0.1 and 0.49, preferably between 0.1 and 0.3, and most preferably 0.25. For example, an offset can be added to each pixel, in order to achieve the above predefined average value. The offset can be calculated for each frame individually, but constant within one frame. This facilitates embedding the message part based on the motion map (i.e. the message part corresponding to the higher motion values) even in a video frame that has less or no moving objects in the corresponding video signal, which would lead to a magnitude close to zero without the offset. Likewise, in case there is too much motion between the first and second video frame, a negative offset can reduce the otherwise high values of the motion map.

Furthermore, setting the respective motion map values in such a manner that the average value is below 0.5, such as preferably at 0.25, has the effect that the first message part, which can include at least 50% of the message, is hidden (embedded) in those 25% of the image content of the second video frame with the most movement, while the second message part, which can include 50% of the message or less, is hidden (embedded) in those 75% of the second video frame with the least movement. In other words, embedding the second message part in 75% of the second video frame allows more area per bit (of the message) resulting in a better video quality (i.e., showing less artefacts or other visible modifications of the video data). For instance, the first feature map, i.e. the concatenated data representing the second video frame having the first message part embedded therein, is pixel-wise multiplied with the corresponding motion map value, and the second feature map, i.e. the concatenated data representing the second video frame having the second message part embedded therein, is pixel-wise multiplied with the inverse of the corresponding motion map value (, i.e., multiplied with 1-"motion map value"). By merging both multiplied feature maps, e.g. adding the multiplied feature maps together, the above described distribution of the first and second message parts over the second video frame, according to dynamic and rather static motion, is achieved.

In yet another implementation variant, the method further comprises training the embedding of the first and second message parts in pixels of the second video frame. The training can include setting up a convolutional neural network (CNN) or encoder network configured to embed the first and second message parts in the pixels of the second video frame. Training the CNN can comprise transmitting the steganography frame (i.e., the second video frame having the message embedded therein) to another neural network (referred to as "adversary network") configured to detect whether the steganography frame includes embedded information. In other words, the adversary network, which can be a conventional network or module, is trained to evaluate whether a video signal contains "original" frame data or hidden data, also known as "steganalysis". Such steganalysis network can respond with a probability of the second video frame including a hidden message. The CNN is now trained based on the result of the steganalysis. Particularly, the CNN is trained to embed the message in such a way that the steganalysis responds always with a probability of 50% or close to 50%. Thus, the adversary network "detects" the hidden message with the same probability as the "original" video frame, i.e. no clear detection is achieved.

For instance, the CNN can be implemented in the pre-processing and/or post-processing of the data representing the second video frame before and after concatenation, respectively, as described above.

Furthermore, according to an implementation variant, the method can further comprise transmitting the trained neural network (model) to a decoder. Thus, a decoder can decode the steganography frame and retrieve the message embedded therein on the basis of the trained encoder network. Alternatively or additionally, the decoder network can be trained together with the encoder network, so that both have a corresponding model for decoding and encoding, respectively.

According to a second aspect to better understand the present disclosure, a computer-readable medium is configured to store executable instructions that, when executed by a processor, cause the processor to perform the method according to the first aspect or at least one of its implementation variants. For example, the computer-readable medium can be a volatile or non-volatile memory, such as a CD, DVD, USB-stick, RAM, ROM memory or the like.

According to a third aspect to better understand the present disclosure, a graphical encoder is configured to perform the method according to the first aspect or at least one of its implementation variants. Such graphical encoder can be implemented in hardware, software or a combination thereof. The graphical encoder can further be employed in any graphic system processing video image data and requiring storing of additional information in a frame-synchronous manner.

According to a fourth aspect to better understand the present disclosure, a system comprises a camera configured to capture a video signal, and a graphical encoder configured to perform the method according to the first aspect or at least one of its implementation variants.

The system can be implemented in a vehicle or can be a vehicle, such as a car, truck, motorbike, bicycle, ship or aircraft. Furthermore, the system can also be implemented in a mobile device, such as a mobile telephone, tablet computer, laptop or the like.

In an implementation variant, the system can comprise an object detector configured to identify and classify at least one object in the second video frame, wherein the object detector outputs the message, and wherein the information included in the message comprises at least identification and/or classification information of the at least one object. Such object detector may be employed in the system, in order to identify and classify objects surrounding the system. For instance, with respect to a vehicle such object detector may be a system component of the vehicle processing the video signal captured by the camera, in order to identify and classify objects surrounding the vehicle, such as other vehicles, pedestrians, bicycles, trees, houses, street marks, etc.

The graphical encoder can then be configured to embed the message containing the information associated to the second video frame and output by the object detector in the second video frame. Thus, a data signal can be achieved in form of the video signal supplemented with information about objects relating to the particular video frame. The object information can, hence, be stored with the video data in a frame-synchronous manner, i.e. the identification and/or classification information of the at least one object present in the second video frame is stored together with the second video frame.

In another implementation variant, the system can further comprise a data interface configured to output the second video frame having the first and second message parts embedded therein. This modified second video frame is also referred to as a steganography frame (or short "stego frame"), since the message is hidden in the second video frame as the second video frame can be displayed on a display without significant visibility of the presence of the message. Thus, the data signal output by the data interface corresponds to a "normal" video signal and can be processed as such.

In yet another implementation variant, the data interface can be configured to compress the second video frame having the first and second message parts embedded therein. Thus, storage and/or transmission of the video data in compressed form saves storage space and/or bandwidth as in conventional video image processing systems. Alternatively, a video compressing module is employed before passing the compressed video data to the data interface.

In a further implementation variant, the system, particularly when installed in a vehicle or being a vehicle, can further comprise a driver assistance system configured to receive the second video frame from the data interface and to decode the message from the second video frame. The driver assistance system, hence, is able to derive information about the second video frame, such as at least one object being present in the vicinity of the vehicle. For instance, in case the message includes information output by the object detector, the driver assistance system can decode the identification and/or classification of one or more objects from the second video frame. Based on this information, the driver assistance system can assist the driver of the vehicle with information about the object(s), such as a warning, a speed limit sign, highlighting a pedestrian, cyclist or other vehicle in the second video frame. The driver assistance system can further include a display, such as a head-up display, where information about the object(s) can be displayed to the driver of the vehicle.

In yet a further implementation variant, the system can further comprise a display configured to receive the second video frame from the data interface and to display the second video frame. Such display can be employed to simply display the video signal as derived from the graphical encoder. For instance, the video may be displayed by a virtual rear mirror, on a display for showing the background of the vehicle when reversing or the like. Although the second video frame (and also subsequent video frames) may have messages embedded therein, the resulting video signal (the steganography frames) can be displayed on the display as any other video signal.

In another implementation variant, the graphical encoder can further comprise a neural network configured to embed the first and second message parts in the pixels of the second video frame. The neural network can be a convolutional neural network (CNN) or encoder network. Training the CNN can comprise transmitting the steganography frame (i.e., the second video frame having the message embedded therein) to another neural network (referred to as "adversary network") configured to detect whether the steganography frame includes embedded information. In other words, the adversary network, which can be a conventional network or module, is trained to evaluate whether a video signal contains "original" frame data or hidden data, also known as "steganalysis". Such steganalysis network can respond with a probability of the second video frame including a hidden message. The CNN is trained based on the result of the steganalysis. Particularly, the CNN is trained to embed the message in such a way that the steganalysis responds always with a probability of 50% or close to 50%. Thus, the adversary network "detects" the hidden message with the same probability as the "original" video frame, i.e. no clear detection is achieved.

Furthermore, according to an implementation variant, the system can further comprise a decoder, e.g., formed by or including a CNN. The decoder network can be configured to receive the trained neural network (model) from the encoder or to load or otherwise implement the trained model. Thus, the decoder can decode the steganography frame and retrieve the message embedded therein on the basis of the trained encoder network. Alternatively or additionally, the encoder network can be trained together with the decoder network, so that both have a corresponding model for encoding and decoding, respectively.

According to a fifth aspect to better understand the present disclosure, a vehicle comprises a camera, and a graphical encoder configured to perform the method according to the first aspect or one or more of the associated implementation variants. The graphical encoder may be a dedicated encoder processor or may form part of a vehicle computing system, such as an engine control unit (ECU) or the like.

Furthermore, the vehicle can further comprise any component, according to the fourth aspect or one of its implementation variants.

The present disclosure is not restricted to the aspects and variants in the described form and order. Specifically, the description of aspects and variants is not to be understood as a specific limiting grouping of features. It is to be understood that the present disclosure also covers combinations of the aspects and variants not explicitly described. Thus, each variant or optional feature can be combined with any other aspect, variant, optional feature or even combinations thereof.

Preferred embodiments of the invention are now explained in greater detail with reference to the enclosed schematic drawings, in which FIG. 1 schematically illustrates an encoder, FIG. 2 schematically illustrates an encoder in more detail, FIG. 3 schematically illustrates a flow diagram of a method for embedding information in a video signal, FIG. 4 schematically illustrates a system in form of a vehicle, FIG. 5 schematically illustrates an electronic device, and FIG. 6 schematically illustrates a training assembly.

Figure 1:
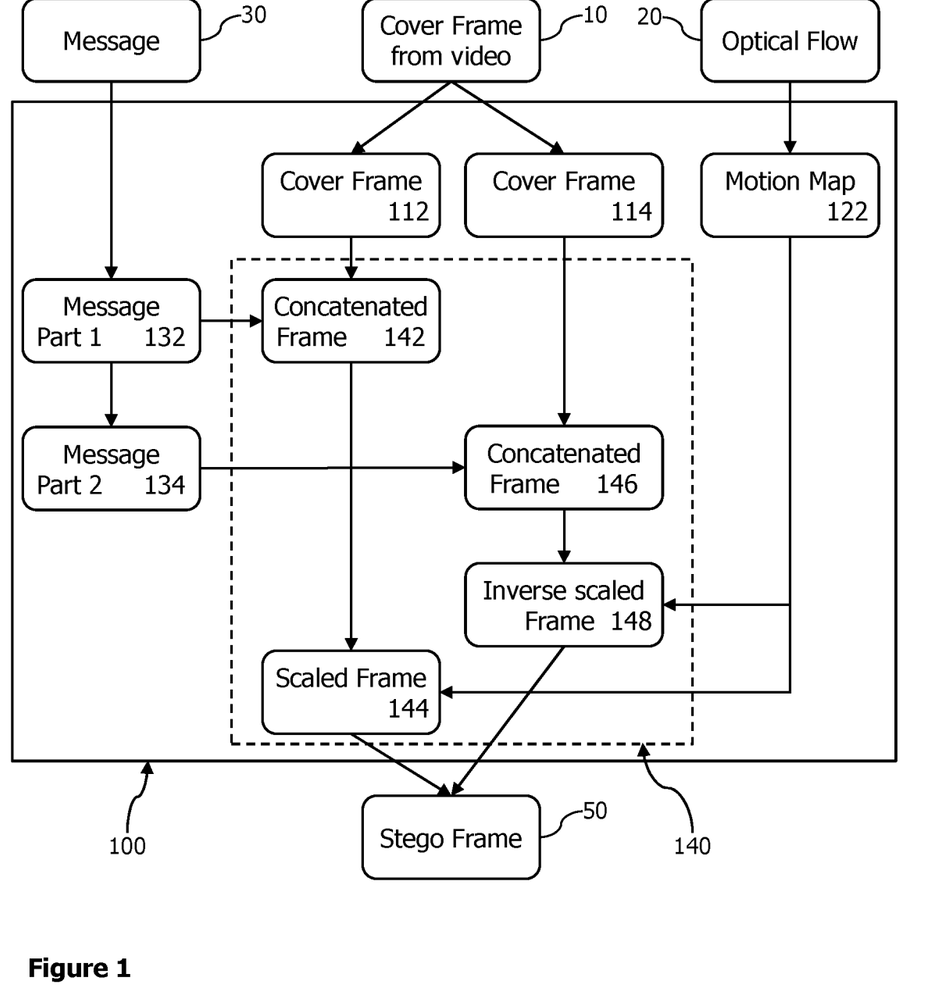

FIG. 1 schematically illustrates an encoder 100 configured to perform a method for embedding information in a video signal. Specifically, the encoder 100 receives a message 30 including the information to be embedded in the video signal, and further receives a video frame 10 (also referred to as "cover frame" used in this disclosure interchangeably) from a video signal. For instance, the video signal includes a first video frame 9 (FIG. 2) and a second video frame 10 acquired from the video signal, wherein the second video frame 10 is temporally subsequent to the first video frame 9.

The encoder 100 divides the message 30 in a first message part 132 and a second message part 134, for example by dividing the message 30 on a bit basis, symbol basis and/or graphical object basis. The first message part 132 can comprise at least 50% of the message 30 and the second message part 134 can comprise the remainder of the message 30. This dividing of the message 30 allows embedding the information of the respective message part 132, 134 in a different manner in the second video frame 10.

For example, the encoder 100 can copy data representing the cover frame 10 (the second video frame 10) to provide a first copy 112 and a second copy 114 thereof. The first message part 132 can then be embedded into pixels of the first copy 112 of the cover frame 10 and the second message part 134 can be embedded into pixels of the second copy 114. The embedding can, for example, be achieved by concatenating the first and second message parts 132, 134 to the first and second copies 112, 114 of the data representing the cover frame 10, respectively.

This embedding takes into account a motion of regions and/or objects present in the cover frame 10, since altered pixels due to the embedded message parts 132, 134 may lead to artefacts or other changes of the video signal, which are less visible for the human visual system in moving regions/objects. To do so, the first video frame 9 and the second video frame 10 are acquired from the video signal, and a motion map 112 associated with the second video frame 10 is determined. The motion map 112 indicates a movement of each of the pixels of the second video frame 10 compared to the first video frame 9. Such one or more regions may be a single pixel or groups of pixels. As an example only, an object captured by a camera outputting the video signal will be represented by a group of pixels in the second video frame 10. If the object moves relative to the camera from the first video frame 9 to the second video frame 10, the group of pixels in the second video frame 10 will have a particular motion/movement with respect to the first video frame 9, particularly the pixel positions of the pixels representing the object in the first and second video frame 9, 10. The motion map 122 is a representation over the entire second video frame 10, i.e. all pixels in a width and height direction of the second video frame 10, indicating the motion/movement of each pixel (or pixel region) relative to the first video frame 9.

The embedding of the first and second message parts 132, 134 and pixels of the second video frame 10 is then performed on the basis of the motion map 122. For instance, the first message part 132 is embedded in the pixels of the second video frame 10 (the first copy 112 thereof) including weighting the first message part 132 for each pixel of the second video frame 10 based on the motion map 122. Likewise, the second message part 134 is embedded in the pixels of the second video frame 10 (the second copy 114 thereof) including weighting the second message part 134 for each pixel of the second video frame 10 based on an inverse of the motion map 122. For instance, the weighting can include multiplying data including the first message part on a pixel by pixel basis with the value of the motion map and multiplying data including the second message part on a pixel by pixel basis with an inverse of the motion map. This embedding based on the motion map 122 and an inverse thereof, may be performed by a submodule 140 of the encoder 100, such as a specially trained convolutional neural network. The results are scaled frames 144, 148 including the embedded message 30.

As indicated in FIG. 1, as one example only, the average movement of the motion map 122 is set to a predefined average value, here 0.25. In other words, individual values of the motion map 122 are calculated as being a value between zero (static) and 1 (dynamic) and are set in such a manner that the predefined average value of the second video frame 10 is between 0.1 and 0.49, preferably between 0.1 and 0.3, and most preferably (as illustrated) 0.25. Thus, embedding the first message part 132 in pixels of the second video frame 10 with a focus on pixels (regions) of higher motion, while the second message part 134 is embedded in pixels of the second video frame 10 with a focus on pixels (regions) of lower motion. Therefore, a portion of the message 30, i.e. the first message part 132, such as 50% of the messages 30 or more, is embedded (hidden) in 25% of the second video frame 10 being rather dynamic, while the remainder (50% or less) of the message 30 is embedded in 75% of the second video frame 10 being rather static.

The encoder 100 may receive or calculate the motion map 122 from an optical flow 20 provided by a conventional optical flow module.

After embedding the first and second message parts 132, 134 in the second video frame data copies 112, 114, a steganography frame 50 is formed by merging the pixels of both scaled frames 144, 148.

Figure 2:
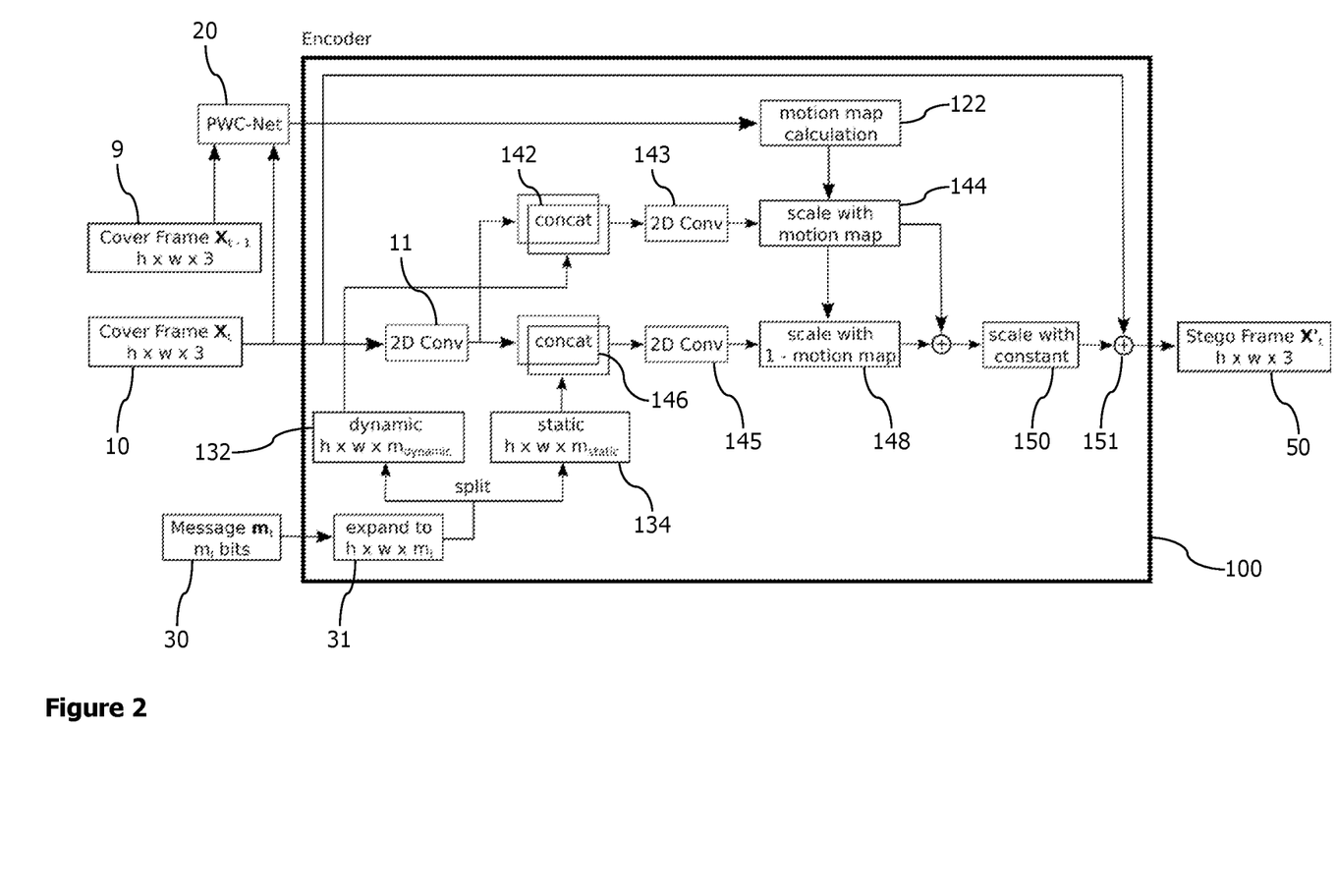

FIG. 2 schematically illustrates the encoder 100 in more detail. Elements and components of the encoder 100, which were already explained with respect to FIG. 1 are indicated by the same reference signs and their explanation will be omitted to avoid redundant disclosure.

For instance, the optical flow 20 can be calculated by a neural network, such as a PWC-Net (pyramid, warping, cost volume network) based on the video signal. Particularly, the optical flow 20 can be calculated on a difference between the first cover frame 9 and the temporally subsequent cover frame 10. The optical flow 20 is then provided to the motion map calculation 122.

The bits of the message 30 are expanded at 31, so that a 3D-tensor is formed. The 3D-tensor includes a channel for each bit of the message 30, while each bit is copied over height and width (h×w) of each respective channel. Thus, each bit is spatially replicated. This expanded message 31 is then split or divided into first message part 132 and second message part 134.

At 142 and 146, the first and second message parts 132, 134 are concatenated with the cover frame 10, or a copy 112, 114 of data representing the cover frame 10. As an example only, in each of concatenation modules 142, 146 the 3D tensor of the respective message part 132, 134 is added to the feature maps derived from module 11. In convolution modules 11, 143 and 145 a 2D convolutional layer processing takes place, which transforms the cover frame 10 into Feature Maps. Such modules 11, 143 and 145 can include several filter kernels. For instance, as one example only, 64 filter kernels with a kernel size of 3×3 can be implemented for module 11, while three filter kernels and a kernel size of 1×1 can be implemented for modules 143 and 145.

As an example only, modules 11, 143 and 145 can be implemented in form of a CNN.

The output of convolution modules 143, 145 is then pixel-wise multiplied with the motion map values of the motion map 122 and an inverse of the motion map values (1—Motion Map Value) at modules 144 and 148, respectively. In other words, a weighting of the first message part 132 and the second message part 134 based on the motion map 122 and an inverse of the motion map 122 takes place, respectively. The weighting is not performed on the message bits themselves, but on data representing the second video frame (cover frame) 10, such as the feature map of frame 10.

The output of each scaling module 144, 148 is then added to form data corresponding to the cover frame 10 having the message 30 embedded therein. Optionally, at scaling module 150 the added data from scaling modules 144, 148 can further be scaled with a constant, for example, to increase or decrease the data values after the pixel-wise multiplication on a frame by frame basis. For instance, in case (almost) no motion is present or very high emotion is present in one frame 10, such exceptions can be levelled, in order to achieve output data still including the entire message 30.

Finally, at 151 the output of scaling modules 144, 148 and/or scaling module 150 can be added to the original unaltered cover frame 10. Thus, the message 30 is embedded (hidden) in the cover frame 10.

Figure 3:
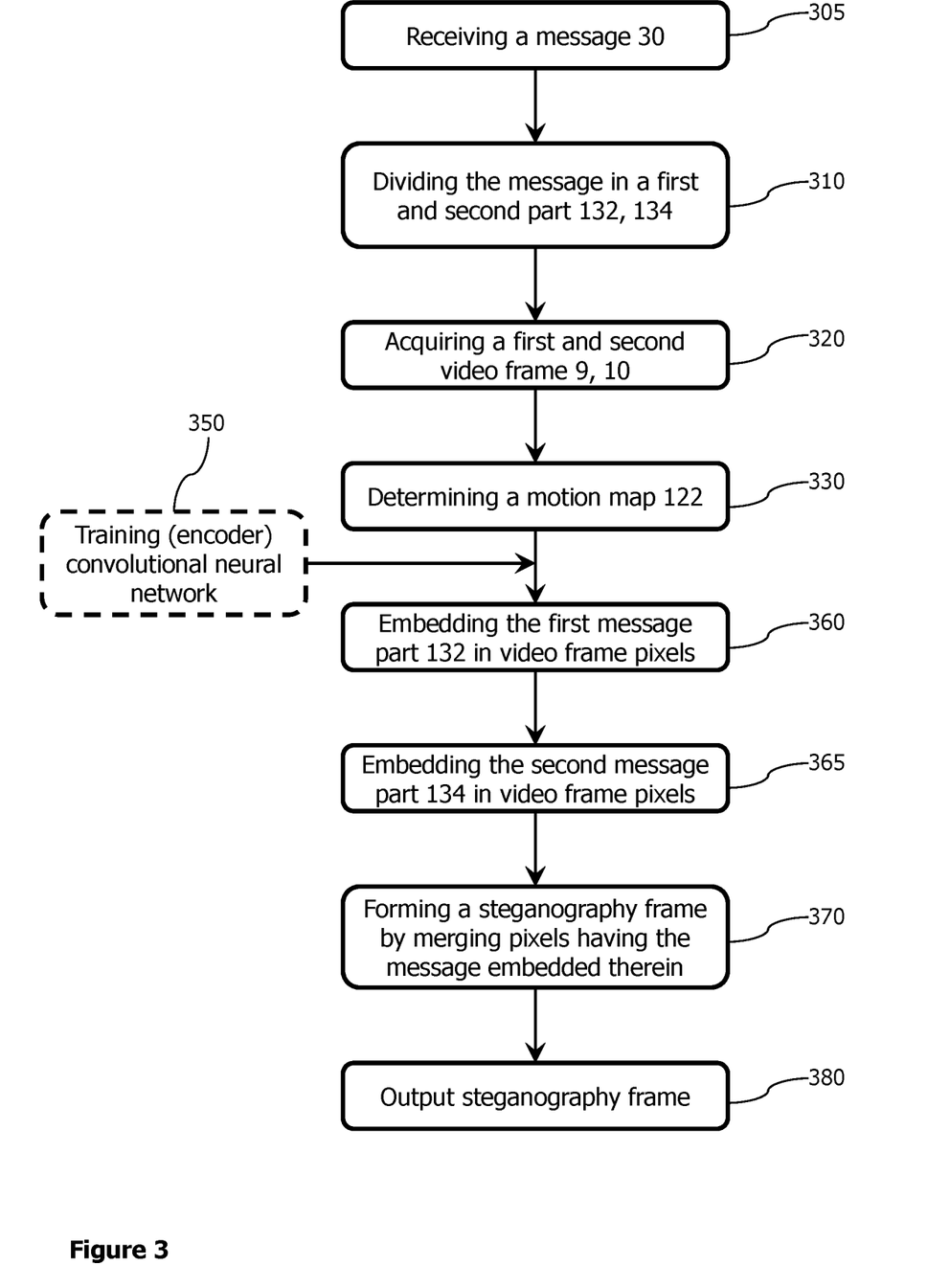

FIG. 3 schematically illustrates a flow diagram of a method for embedding information in a video signal. The method starts in step 305 by receiving the message 30, which includes information to be hidden in a video frame 10. In step 310, the message 30 is divided in a first message part 132 and a second message part 134. A first video frame 9 and a second video frame 10 are acquired, in step 320, from the video signal, the second video frame 10 being temporally subsequent to the first video frame 9.

In step 330, a motion map 122 associated with the second video frame 10 is determined. The motion map 122 indicates a movement of each of the pixels of the second video frame 10 compared to the first video frame 9.

Once or continuously, in step 350, an encoder convolutional neural network (CNN) 140 can be trained. The encoder convolutional neural network 140 can be trained to embed the first and second message parts 132, 134 in pixels of the second video frame 10, so that an adversary network 420 (FIG. 6) trained to evaluate whether a video signal contains hidden data or not, detects the message 30 embedded in the second video frame 10 with the same probability as determining that the second video frame 10 is unaltered. Thus, the adversary network 420 is actually not able to distinguish between altered and unaltered video frames 10.

On the basis of this motion map 122 the first message part 132 and the second message part 134 are embedded in the pixels of the second video frame 10 (steps 360 and 365). Particularly, the values in the motion map 122 are multiplied pixel by pixel with data representing the second video frame 10 having the first message part 132 embedded therein, and an inverse of the values in the motion map 122 are multiplied pixel by pixel with data representing the second video frame 10 having the second message part 134 embedded therein. For example, the embedding of steps 360 and 365 may be performed using the trained CNN 140.

Thereafter, in step 370, a steganography frame 50 is formed by merging the data 144 representing the second video frame 10 having the first message part 132 embedded therein with data 148 representing the second video frame 10 having the second message part 134 embedded therein. This steganography video frame 50 can then be output in step 380, for example, to a display for displaying the video frame 50 or a module decoding the steganography frame 50 and extracting the message 30 therefrom.

Figure 4:
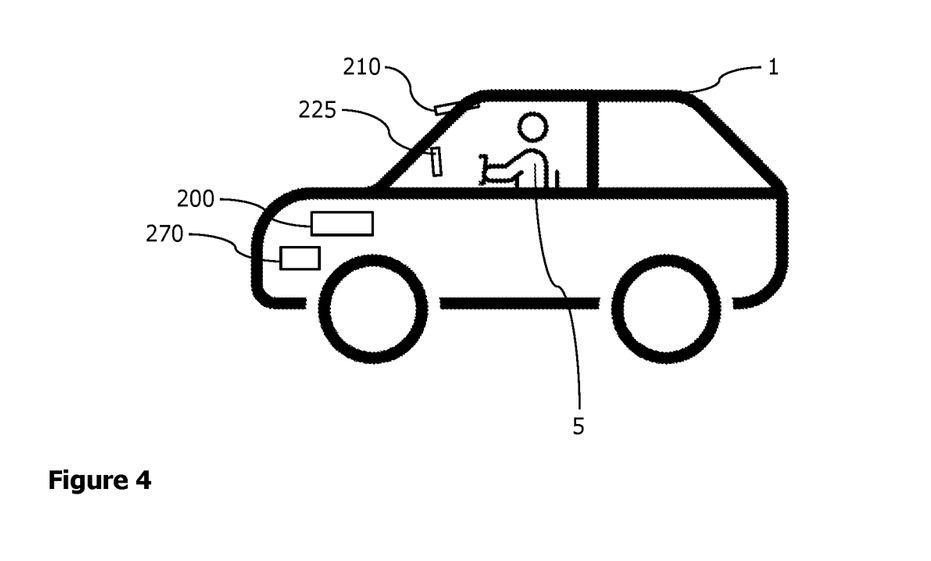

FIG. 4 schematically illustrates a system 1, here in form of a vehicle, which is only one example of the system 1. The system 1 can include a camera 210 configured to capture a video signal, such as the video signal comprising the first and second video frames 9, 10 (FIGS. 1 and 2). The camera 210 can capture a video signal representing a scene in the vicinity of the system 1, such as in front of the system 1.

Furthermore, the system 1 can include a graphical encoder 100, such as the encoder 100 of FIGS. 1 and 2. The graphical encoder 100 can form part of an electronic device 200 (FIG. 5), which is installed in or forms part of the system 1. For example, the electronic device 200 can be a mobile phone, a tablet computer, a laptop, a PC, an ECU of a vehicle 1, or the like.

The system 1 and/or the electronic device 200 can further include an object detector 250 configured to identify and classify at least one object in the video signal captured by the camera 1, particularly in the second video frame 10 thereof. The object detector 250 can output the message 30 including information comprising at least identification and/or classification information of the at least one object. This identification and/or classification information (forming the message 30) is to be stored together with the second video frame 10, so that a frame-synchronous availability of the message 30 can be provided. This is achieved by the graphical encoder 100 embedding the message 30 in the second video frame 10 as explained with respect to FIGS. 1 to 3.

Figure 5:
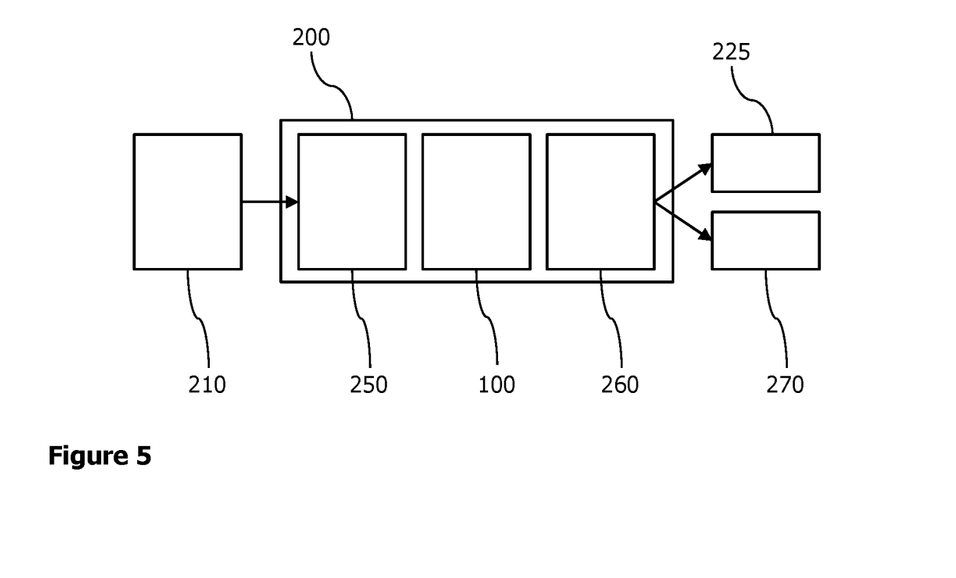

The system 1 and/or electronic device 200 can further comprise a data interface 260 configured to output the second video frame 50 having the first and second message parts 132, 134 embedded therein. Optionally, a compression of the video signal may take place at the data interface 260 or a dedicated compression module (not illustrated).

The resulting steganography frame 50 output by the data interface 260 can be displayed on the display 225 of the system 1 and/or electronic device 200. Due to the embedded message 30, the steganography frame 50 may lead to one or more artefacts or other eventually visible alteration of the video signal. However, since the message 30 is embedded based on the motion map 122, such alterations of the video signal may not be recognized by a user, such as the driver 5 of the vehicle.

The steganography frame 50 output by the data interface 260 can likewise be received by a further component 270 of the system 1 and/or electronic device 200, such as a driver assistance system 270 being one example of such further component 270. This component 270 is configured to decode the message 30 from the steganography frame 50. During the decoding, the component 270 has the video information of the second video frame 10 as well as the message 30 available in a frame-synchronous manner. For instance, if the message 30 includes information about an object identified by the object detector 250, the driver assistance system 270 can provide information about the object either alone or together with the second video frame 50 to the driver 5, such as a warning, highlighting of the object in the video signal or the like.

Figure 6:
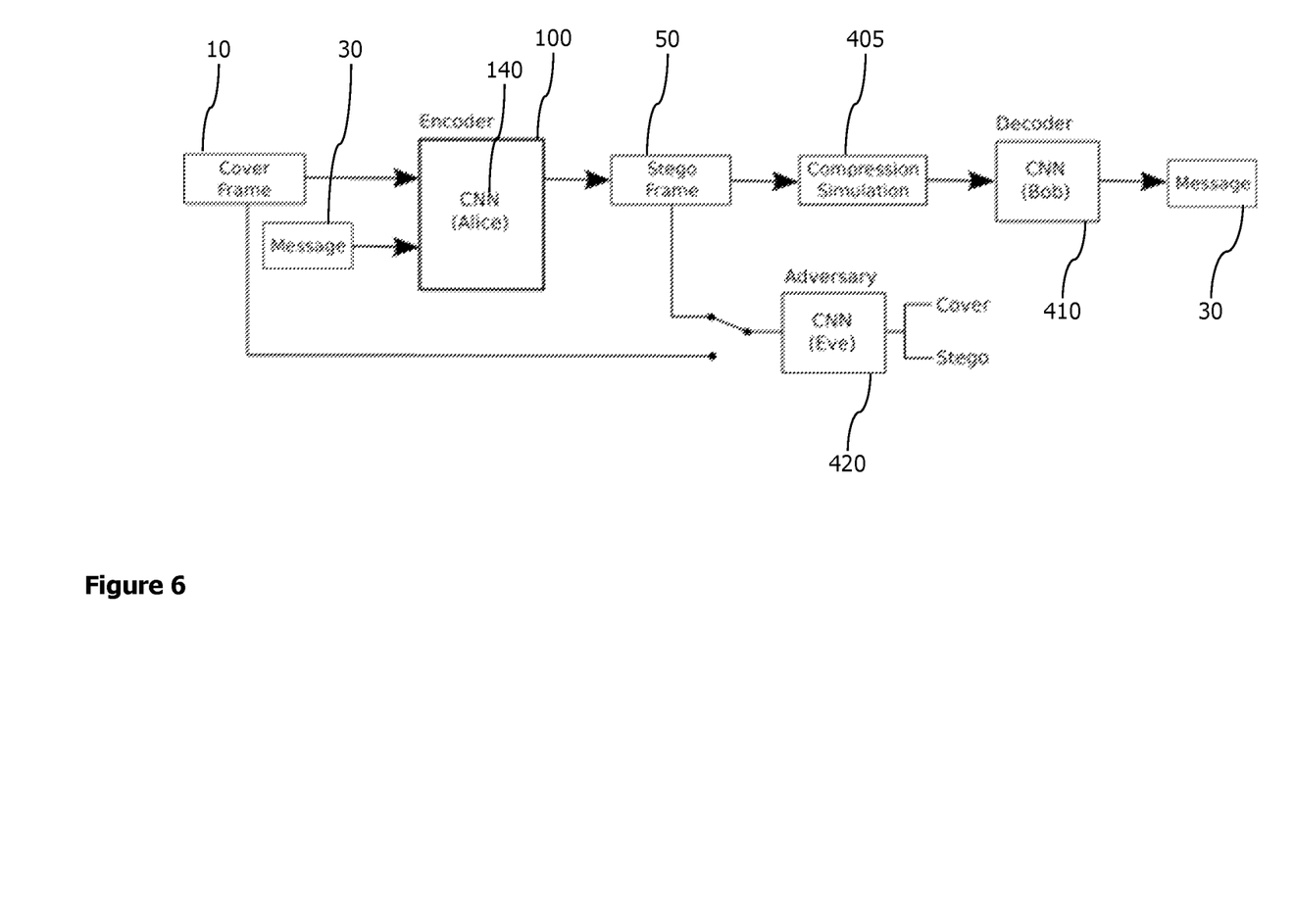

FIG. 6 schematically illustrates a training assembly, for example, a training assembly for training the encoder 100. Again with additional reference to FIGS. 1 and 2, certain components of the encoder of FIGS. 1 and 2 are also present in the assembly of FIG. 6, and their explicit description is omitted to avoid redundancies. The encoder 100 can include a convolutional neural network 140 capable of embedding the message 30 in the cover frame 10 resulting in a steganography frame 50.

In order to achieve good results with respect to less or none visible effects, such as artefacts or other pixel alterations, the steganography frame 50 can be transmitted to an adversary network 420 trained to evaluate whether the steganography frame 50 contains hidden data, such as message 30 or not. The output of the adversary network 420 is a probability whether the received frame 50 is the "original" cover frame 10 or a modified steganography frame 50, i.e. a video frame having the message 30 embedded therein. The adversary network 420 can be a conventional network providing steganalysis on a video signal.

The CNN 140 is trained in such a manner, that the adversary network 420 detects that the message 30 is embedded in the second video frame 50 with the same probability as determining that the second video frame 10 is unaltered. Thus, it is actually not detectable whether the message 30 is embedded in the video frame 10/50 or not.

Once trained, the encoder 100 and CNN 140 can operate without adversary network 420 and output one or more steganography frame(s) 50. This steganography frame 50 or the resulting video signal can be compressed in compression module 405 to store and/or transmit the video signal with reduced bandwidths. A decoder 410 may receive the compressed video signal and can decode it, i.e. decompresses the video signal and retrieves the message 30 from the included steganography frames 50. In order for decoder 410 to operate properly and to correctly "decipher" the message 30, decoder 410 can also include a neural network (CNN). This CNN of the decoder 410 can either be trained together with the encoder network 410 (as explained above) or the model of the encoder network 410 may be transmitted to the decoder 410 from the encoder 100 once the encoder 100 has been fully trained.

The above description of the drawings is to be understood as providing only exemplary embodiments of the present invention and shall not limit the invention to these particular embodiments.

The invention claimed is:

1. A method for embedding information in a video signal, the method comprising:
receiving a message including the information;
dividing the message in a first message part and a second message part;
acquiring a first video frame and a second video frame from the video signal, the video frames each including a pre-set number of pixels, wherein the second video frame is temporally subsequent to the first video frame;
determining a motion map associated with the second video frame, wherein the motion map indicates a movement of each of the pixels of the second video frame compared to the first video frame;
embedding the first message part in the pixels of the second video frame including weighting the first message part for each pixel of the second video frame based on the motion map; and
embedding the second message part in the pixels of the second video frame including weighting the second message part for each pixel of the second video frame based on an inverse of the motion map.

2. The method according to claim 1, wherein the first message part comprises at least 50% of the message and the second message part comprises the remainder of the message.

3. The method according to claim 1, wherein embedding the first message part comprises providing a first copy of data representing the second video frame, concatenating the first message part to the first copy, and weighting the concatenated data based on the motion map; and
wherein embedding the second message part comprises providing a second copy of data representing the second video frame, concatenating the second message part to the second copy, and weighting the concatenated data based on the inverse of the motion map.

4. The method according to claim 3, further comprising:
forming a steganography frame by merging the pixels of the second video frame having the first message part embedded therein with the pixels of the second video frame having the second message part embedded therein and, preferably, by further merging with the pixels of the second video frame as acquired from the video signal.

5. The method according to claim 3, wherein dividing the message comprises generating a first 3D-tensor having the message bits of the first message part as each bit copied over width and height of one channel of the tensor, wherein width and height corresponds to a width and height of the pixels of the second video frame, and generating a second 3D-tensor having the message bits of the second message part as each bit copied over width and height of one channel of the tensor, wherein width and height corresponds to the width and height of the pixels of the second video frame.

6. The method according to claim 1, wherein determining the motion map comprises calculating individual values of the motion map for each of the pixels as being a value between zero and 1 and with a predefined average value of the second video frame, the predefined average value of the second video frame being between 0.1 and 0.49, preferably between 0.1 and 0.3, and most preferably being 0.25.

7. The method according to claim 1, wherein determining a motion map comprises calculating an optical flow between the first and second video frames.

8. The method according to claim 1, further comprising:
training a convolutional neural network or encoder network configured to embed the first and second message parts in the pixels of the second video frame, so that an adversary network trained to evaluate whether a video signal contains hidden data detects the message embedded in the second video frame with the same probability as determining that the second video frame is unaltered.

9. A graphical encoder configured to perform the method according to claim 1.

10. A system comprising:
a camera configured to capture a video signal; and
a graphical encoder configured to perform the method according to claim 1.

11. The system according to claim 10, further comprising:
an object detector configured to identify and classify at least one object in the second video frame, wherein the object detector outputs the message, and wherein the information included in the message comprises at least identification and/or classification information of the at least one object,
wherein the graphical encoder is configured to embed the message containing the information associated to the second video frame and output by the object detector in the second video frame.

12. The system according to claim 10, further comprising:
a data interface configured to output the second video frame having the first and second message parts embedded therein, wherein, preferably, the data interface is further configured to compress the second video frame having the first and second message parts embedded therein.

13. The system according to claim 12, further comprising:
a driver assistance system configured to receive the second video frame from the data interface and to decode the message from the second video frame.

14. The system according to claim 12, further comprising:
a display configured to receive the second video frame from the data interface and to display the second video frame.

15. The system according to claim 10, further comprising:
an encoder convolutional neural network configured to embed the first and second message parts in pixels of the second video frame; and
an adversary network trained to evaluate whether a video signal contains hidden data,
wherein the encoder convolutional neural network is trained, so that the adversary network detects the message embedded in the second video frame with the same probability as determining that the second video frame is unaltered.

* * * * *